(12) United States Patent
Abraham et al.

(10) Patent No.: US 9,160,431 B2
(45) Date of Patent: Oct. 13, 2015

(54) EFFICIENT GROUP DEFINITION AND OVERLOADING FOR MULTIUSER MIMO TRANSMISSIONS

(75) Inventors: Santosh Paul Abraham, San Diego, CA (US); Sameer Vermani, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 13/028,016

(22) Filed: Feb. 15, 2011

(65) Prior Publication Data

US 2012/0039266 A1    Feb. 16, 2012

Related U.S. Application Data

(60) Provisional application No. 61/328,314, filed on Apr. 27, 2010.

(51) Int. Cl.
*H04B 7/04* (2006.01)

(52) U.S. Cl.
CPC .................................. *H04B 7/0452* (2013.01)

(58) Field of Classification Search
CPC ..................................................... H04B 7/0452
USPC ......................................................... 370/329
See application file for complete search history.

(56) References Cited

U.S. PATENT DOCUMENTS

| 7,986,742 | B2 | 7/2011 | Ketchum et al. |
|---|---|---|---|
| 2005/0047384 | A1 | 3/2005 | Wax et al. |
| 2005/0090264 | A1* | 4/2005 | Kim ............................... 455/455 |
| 2007/0211678 | A1* | 9/2007 | Li et al. ......................... 370/338 |
| 2009/0305711 | A1 | 12/2009 | Rinne et al. |
| 2010/0203882 | A1 | 8/2010 | Frenger et al. |
| 2010/0260159 | A1* | 10/2010 | Zhang et al. .................. 370/338 |
| 2010/0296459 | A1 | 11/2010 | Miki et al. |
| 2010/0309834 | A1 | 12/2010 | Fischer et al. |
| 2011/0002219 | A1 | 1/2011 | Kim et al. |
| 2011/0003598 | A1 | 1/2011 | Ma et al. |
| 2011/0034197 | A1 | 2/2011 | Novak |
| 2011/0064040 | A1 | 3/2011 | Kim et al. |
| 2011/0075607 | A1 | 3/2011 | Kim et al. |
| 2011/0103280 | A1 | 5/2011 | Liu et al. |
| 2012/0120931 | A1 | 5/2012 | Abraham et al. |
| 2013/0070748 | A1 | 3/2013 | Abraham et al. |
| 2013/0121234 | A1 | 5/2013 | Shrivastava et al. |

FOREIGN PATENT DOCUMENTS

| CN | 1799200 A | 7/2006 |
|---|---|---|
| CN | 1826762 A | 8/2006 |

(Continued)

OTHER PUBLICATIONS

Kim, Joonsuk. "GroupID Concept for Downlink MU-MIMO Transmission" IEEE 802.11-10/—73r0. Jan. 18, 2010.*

(Continued)

*Primary Examiner* — Huy D Vu
*Assistant Examiner* — Stephen J Clawson
(74) *Attorney, Agent, or Firm* — Dang M. Vo

(57) ABSTRACT

Certain aspects of the present disclosure present a technique for efficient group definition and overloading for downlink multiuser multiple-input multiple-output (MU-MIMO) transmissions.

38 Claims, 9 Drawing Sheets

(56) References Cited

FOREIGN PATENT DOCUMENTS

| | | |
|---|---|---|
| CN | 101222267 A | 7/2008 |
| EP | 1662677 A1 | 5/2006 |
| EP | 2 106 036 A1 | 9/2009 |
| EP | 2107707 A1 | 10/2009 |
| JP | 2005039728 A | 2/2005 |
| RU | 2008101664 A | 7/2009 |
| WO | 2004038988 A2 | 5/2004 |
| WO | 2006138625 A2 | 12/2006 |
| WO | 2007082252 | 7/2007 |
| WO | WO-2007102546 A1 | 9/2007 |
| WO | WO-2009026018 | 2/2009 |
| WO | WO2009121025 | 10/2009 |
| WO | WO2011057009 | 5/2011 |

OTHER PUBLICATIONS

International Search Report and Written Opinion—PCT/US2011/034209—ISA EPO—Aug. 9, 2011.

Joonsuk Kim et al., "GroupID Concept for Downlink MU-MIMO Transmission", Jan. 18, 2010, pp. Slide 1-Slide 8, XP002645417, Retrieved from the Internet: URL:https://mentor.ieee.org/.../11-10-0073 -00-00ac-group-id-concept-for-dl-mu-mimo.p pt [retrieved on Jun. 28, 2011].

Wang, et al. "Adaptive Downlink Multi-User MIMO Wireless Systems for Correlated Channels with Imperfect CSI," IEEE Transactions on Wireless Communications, vol. 5 No. 9 (Sep. 2006).

Miquel, et al. "On Overload Vector Precoding for Single-User MIMO Channels," IEEE Transactions on Wireless Communications, vol. 9 No. 2 (Feb. 2010).

Kim et al., "Bits Consideration for Signal Fields," IEEE 802.11-10/0382r0, Mar. 15, 2010. [Accessed May 5, 2011], p. 1-12.

Shakya, I.L. et al., "High user capacity collaborative code-division multiple access," Communications, IET, vol. 5, No. 3, pp. 307-319, Feb. 11, 2011.

Stacey et al., "Proposed Specification Framework edits for preamble structure and A-MPDU", IEEE 802.11-09/0992R3, Jan. 21, 2010, pp. 1-7, XP002652702, p. 4-p. 5.

Vermani, "Frame Format for GroupID Management," IEEE 802.11-10/1288r1, Nov. 8, 2010. [Accessed May 5, 2011], p. 1-7.

Wang, et al., "An Efficient Multi-User Detection Scheme for Overloaded Group-Orthogonal MC-CDMA Systems," ISWPC '07, 2nd International Symposium on Wireless Pervasive Computing, Feb. 5-7, 2007, pp. 280-284.

Kim J., et al., "GroupID Concept for Downlink MU-MIMO Transmission", IEEE 802.11-10/0073R0, Jan. 18, 2010, pp. 1-8, XP002652701, the whole document.

Lee D. et al., "MU-MIMO STA Scheduling Strategy and Related PHY Signaling", IEEE 802.11-10/0362r2, Mar. 2010, 15 slide.

European Search Report—EP13020031—Search Authority—Hague—Sep. 13, 2013.

Kim J., et al., "GroupID Concept for Downlink MU-MIMO Transmission", IEEE 802.11-10/0073r2, Mar. 2010.

* cited by examiner

EFFICIENT GROUP DEFINITION AND OVERLOADING FOR MULTIUSER MIMO TRANSMISSIONS

CLAIM OF PRIORITY UNDER 35 U.S.C. §119

The present application for patent claims benefit of U.S. Provisional Patent Application Ser. No. 61/328,314, entitled, "Efficient group definition and overloading for multiuser MIMO transmissions", filed Apr. 27, 2010, and assigned to the assignee hereof and hereby expressly incorporated by reference herein.

BACKGROUND

1. Field

Certain aspects of the present disclosure generally relate to wireless communications and, more particularly, to a method for efficient group definition and overloading for multiuser multiple-input multiple-output (MU-MIMO) transmissions.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes indicating to each apparatus of a plurality of apparatuses, a position of the apparatus in each group of the apparatuses from a plurality of groups for allocating one or more spatial streams, generating a preamble comprising a first field of y bits identifying a group in the plurality of up to $2^y$ groups for receiving simultaneous data transmissions, and transmitting, to the apparatuses, at least a portion of the preamble with the first field preceding the simultaneous data transmissions destined for a set of the apparatuses selected from the group, wherein allocation of one or more spatial streams of the simultaneous data transmissions to each apparatus from the set is specified by the portion of preamble and by the indicated position of that apparatus in the group.

Certain aspects of the present disclosure provide an apparatus for wireless communications. The apparatus generally includes a first circuit configured to indicate to each apparatus of a plurality of other apparatuses, a position of the other apparatus in each group of the other apparatuses from a plurality of groups for allocating one or more spatial streams, a second circuit configured to generate a preamble comprising a first field of y bits identifying a group in the plurality of up to $2^y$ groups for receiving simultaneous data transmissions, and a transmitter configured to transmit, to the other apparatuses, at least a portion of the preamble with the first field preceding the simultaneous data transmissions destined for a set of the other apparatuses selected from the group, wherein allocation of one or more spatial streams of the simultaneous data transmissions to each apparatus from the set is specified by the portion of preamble and by the indicated position of that apparatus in the group.

Certain aspects of the present disclosure provide an apparatus for wireless communications. The apparatus generally includes means for indicating to each apparatus of a plurality of other apparatuses, a position of the other apparatus in each group of the other apparatuses from a plurality of groups for allocating one or more spatial streams, means for generating a preamble comprising a first field of y bits identifying a group in the plurality of up to $2^y$ groups for receiving simultaneous data transmissions, and means for transmitting, to the other apparatuses, at least a portion of the preamble with the first field preceding the simultaneous data transmissions destined for a set of the other apparatuses selected from the group, wherein allocation of one or more spatial streams of the simultaneous data transmissions to each apparatus from the set is specified by the portion of preamble and by the indicated position of that apparatus in the group.

Certain aspects of the present disclosure provide a computer-program product for wireless communications. The computer-program product includes a computer-readable medium comprising instructions executable to indicate to each apparatus of a plurality of apparatuses, a position of the apparatus in each group of the apparatuses from a plurality of groups for allocating one or more spatial streams, generate a preamble comprising a first field of y bits identifying a group in the plurality of up to $2^y$ groups for receiving simultaneous data transmissions, and transmit, to the apparatuses, at least a portion of the preamble with the first field preceding the simultaneous data transmissions destined for a set of the apparatuses selected from the group, wherein allocation of one or more spatial streams of the simultaneous data transmissions to each apparatus from the set is specified by the portion of preamble and by the indicated position of that apparatus in the group.

Certain aspects of the present disclosure provide a communication device. The communication device generally includes at least one antenna, a first circuit configured to indicate to each apparatus of a plurality of apparatuses, a position of the apparatus in each group of the apparatuses from a plurality of groups for allocating one or more spatial streams, a second circuit configured to generate a preamble comprising a first field of y bits identifying a group in the plurality of up to $2^y$ groups for receiving simultaneous data transmissions, and a transmitter configured to transmit, to the apparatuses via the at least one antenna, at least a portion of the preamble with the first field preceding the simultaneous data transmissions destined for a set of the apparatuses selected from the group, wherein allocation of one or more spatial streams of the simultaneous data transmissions to each apparatus from the set is specified by the portion of preamble and by the indicated position of that apparatus in the group.

Certain aspects of the present disclosure provide a method for wireless communications. The method generally includes obtaining, at an apparatus of a plurality of apparatuses, an indication about a position of the apparatus in each group of the apparatuses from a plurality of groups, receiving at least a portion of preamble comprising a first field of y bits identifying a group in the plurality of up to $2^y$ groups for receiving simultaneous data transmissions destined for a set of the apparatuses selected from the group, and determining, based at least in part on the portion of preamble and the indicated position of the apparatus in the group, if one or more spatial streams of the simultaneous data transmissions are allocated to the apparatus.

Certain aspects of the present disclosure provide an apparatus for wireless communications. The apparatus generally includes a first circuit configured to obtain, at the apparatus of a plurality of apparatuses, an indication about a position of the apparatus in each group of the apparatuses from a plurality of groups, a receiver configured to receive at least a portion of preamble comprising a first field of y bits identifying a group in the plurality of up to $2^y$ groups for receiving simultaneous data transmissions destined for a set of the apparatuses selected from the group, and a second circuit configured to determine, based at least in part on the portion of preamble and the indicated position of the apparatus in the group, if one or more spatial streams of the simultaneous data transmissions are allocated to the apparatus.

Certain aspects of the present disclosure provide an apparatus for wireless communications. The apparatus generally includes means for obtaining, at the apparatus of a plurality of apparatuses, an indication about a position of the apparatus in each group of the apparatuses from a plurality of groups, means for receiving at least a portion of preamble comprising a first field of y bits identifying a group in the plurality of up to $2^y$ groups for receiving simultaneous data transmissions destined for a set of the apparatuses selected from the group, and means for determining, based at least in part on the portion of preamble and the indicated position of the apparatus in the group, if one or more spatial streams of the simultaneous data transmissions are allocated to the apparatus.

Certain aspects of the present disclosure provide a computer-program product for wireless communications. The computer-program product includes a computer-readable medium comprising instructions executable to obtain, at an apparatus of a plurality of apparatuses, an indication about a position of the apparatus in each group of the apparatuses from a plurality of groups, receive at least a portion of preamble comprising a first field of y bits identifying a group in the plurality of up to $2^y$ groups for receiving simultaneous data transmissions destined for a set of the apparatuses selected from the group, and determine, based at least in part on the portion of preamble and the indicated position of the apparatus in the group, if one or more spatial streams of the simultaneous data transmissions are allocated to the apparatus.

Certain aspects of the present disclosure provide a wireless node. The wireless node generally includes at least one antenna, a first circuit configured to obtain, at the wireless node of a plurality of wireless nodes, an indication about a position of the wireless node in each group of the wireless nodes from a plurality of groups, a receiver configured to receive, via the at least one antenna, at least a portion of preamble comprising a first field of y bits identifying a group in the plurality of up to $2^y$ groups for receiving simultaneous data transmissions destined for a set of the wireless nodes selected from the group, and a second circuit configured to determine, based at least in part on the portion of preamble and the indicated position of the wireless node in the group, if one or more spatial streams of the simultaneous data transmissions are allocated to the wireless node.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
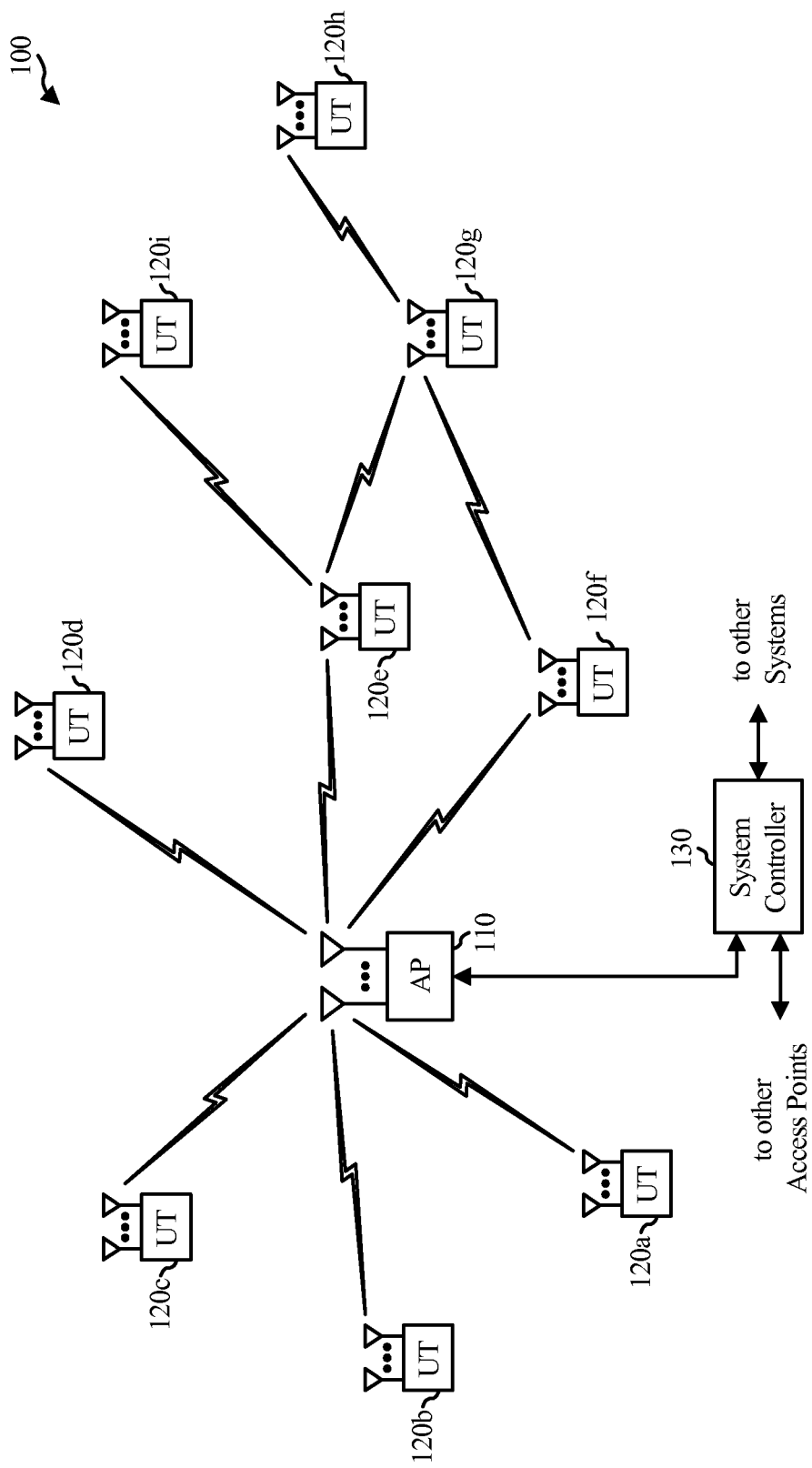
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

In an aspect of the present disclosure, a preamble of a transmission frame may be constructed at the AP 110. The preamble may comprise a group identification field for conveying to all supported user terminals 120 that a particular set of user terminals will be receiving spatial streams of a Multi User (MU) MIMO transmission. The AP 110 may transmit the preamble to the user terminals 120 in accordance with IEEE 802.11 family of wireless communications standard.

Figure 2:
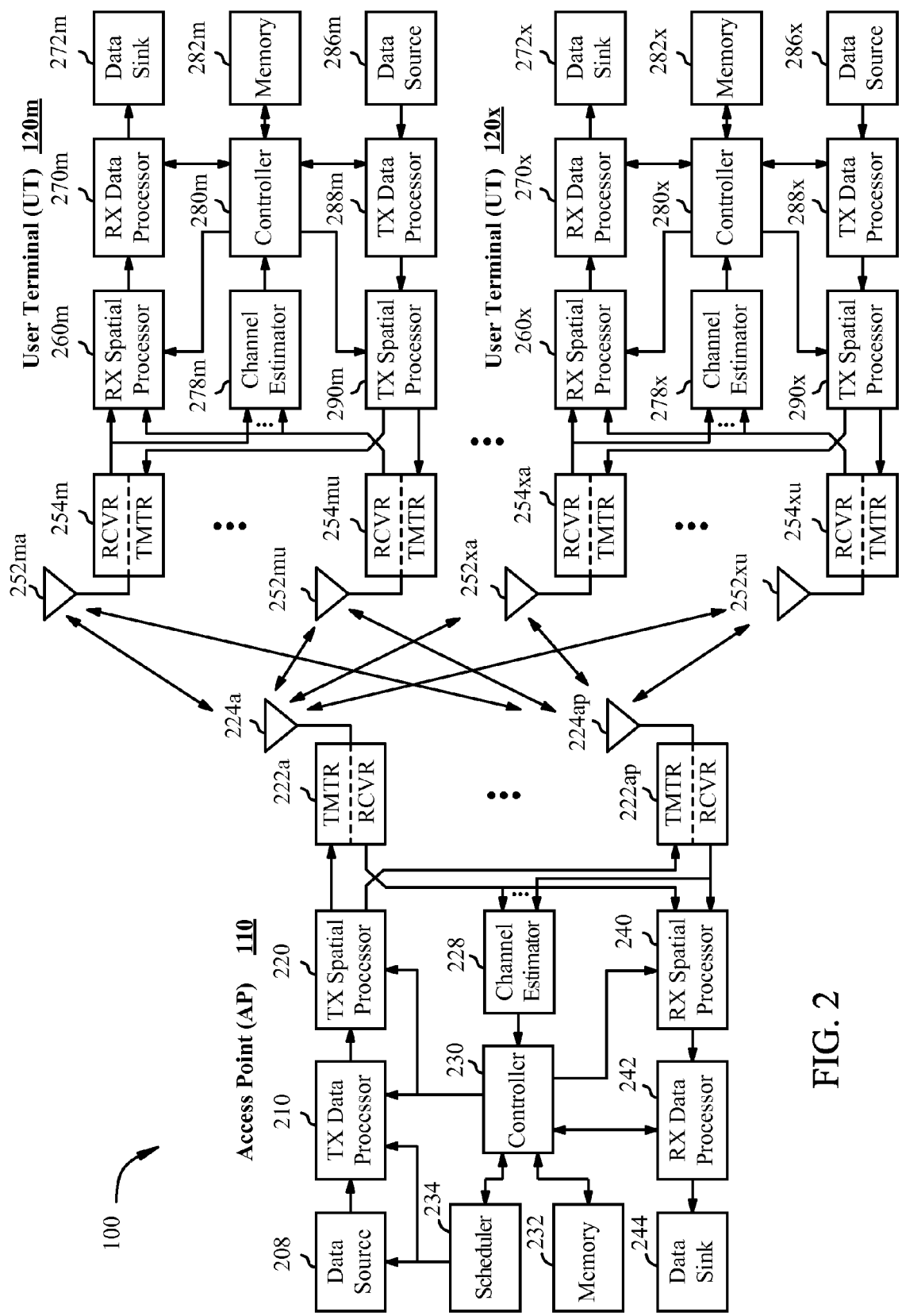
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In an aspect of the present disclosure, the TX data processor 210 of the AP 110 may be configured to construct a preamble of a transmission frame. The preamble may comprise a group identification field for conveying to all supported user terminals 120 that a particular set of user terminals will be receiving spatial streams of a MU-MIMO transmission. The AP 110 may transmit the preamble to the user terminals 120 via the transmitter 222 in accordance with IEEE 802.11 family of wireless communications standard. The RX data processor 270 of the user terminal 120 may be configured to process the received preamble to detect if any of the spatial streams of the MU-MIMO transmission is dedicated to the user terminal.

Figure 3:
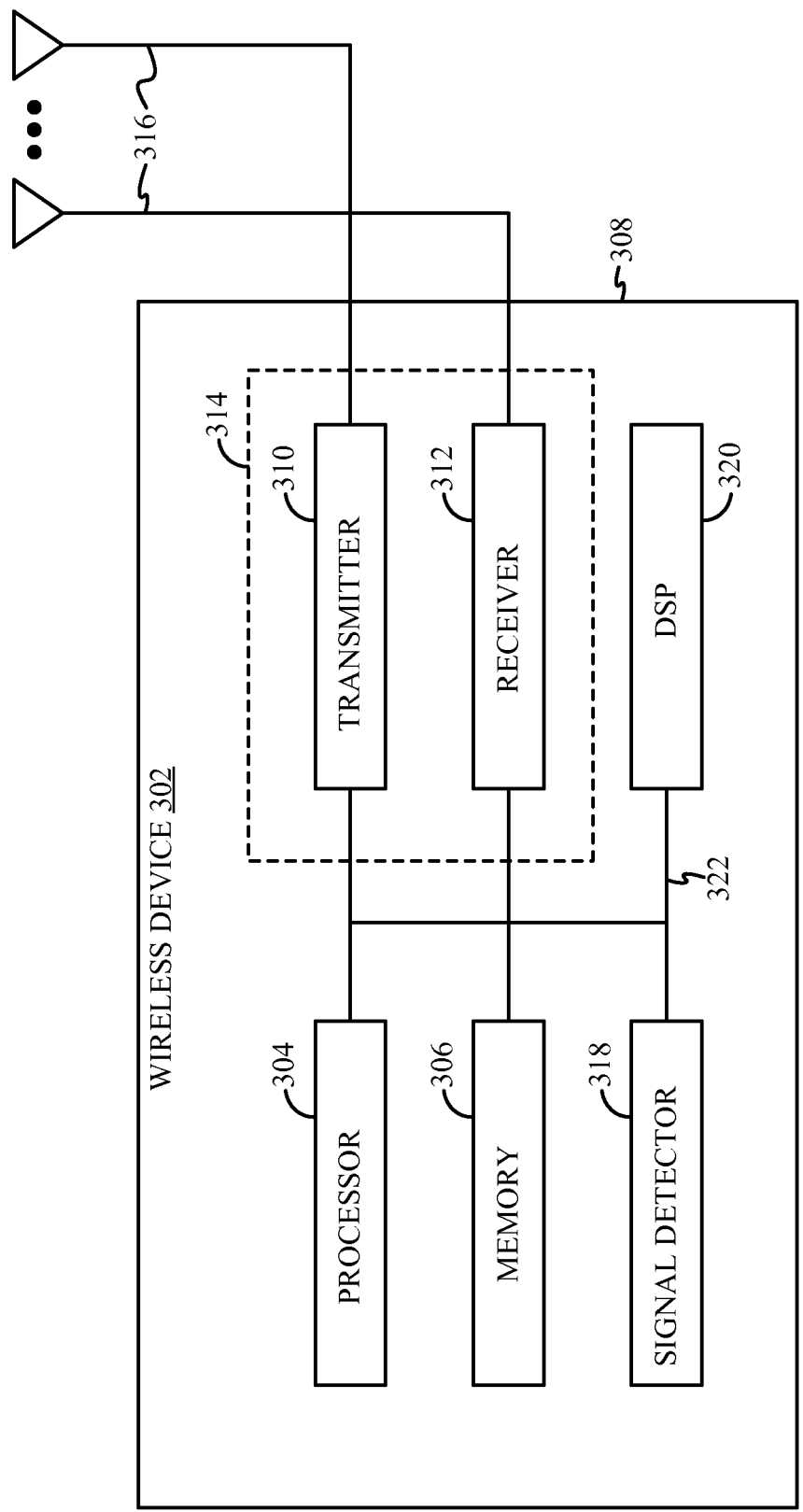
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In an aspect of the present disclosure, the processor 304 of the wireless device 302 may be configured to construct a preamble of a transmission frame. The preamble may comprise a group identification field for conveying to all supported user terminals (not shown) that a particular set of user terminals will be receiving spatial streams of a MU-MIMO transmission. The wireless device 302 may transmit the preamble to the user terminals via the transmitter 310 in accordance with IEEE 802.11 family of wireless communications standard.

In next generation Wireless Local Area Networks (WLANs), such as the WLAN 100 illustrated in FIG. 1, downlink (DL) MU-MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

In order to parse this allocation information at a STA side, each STA may need to know its ordering or a STA number in a set of STAs of the plurality of STAs scheduled to receive the MU-MIMO transmission. This may require formation of groups, wherein a group identification (groupID) field in the preamble may convey, to the STAs, the set of STAs (and their order) being transmitted to in a given MU transmission. With preamble bits adding to the transmission overhead, it may be desirable to expend as little bits on the groupID as possible, while not sacrificing on the flexibility regarding which STAs can be scheduled together in a MU transmission at a given time instant.

Preamble Structure with Group Definition

Figure 4:
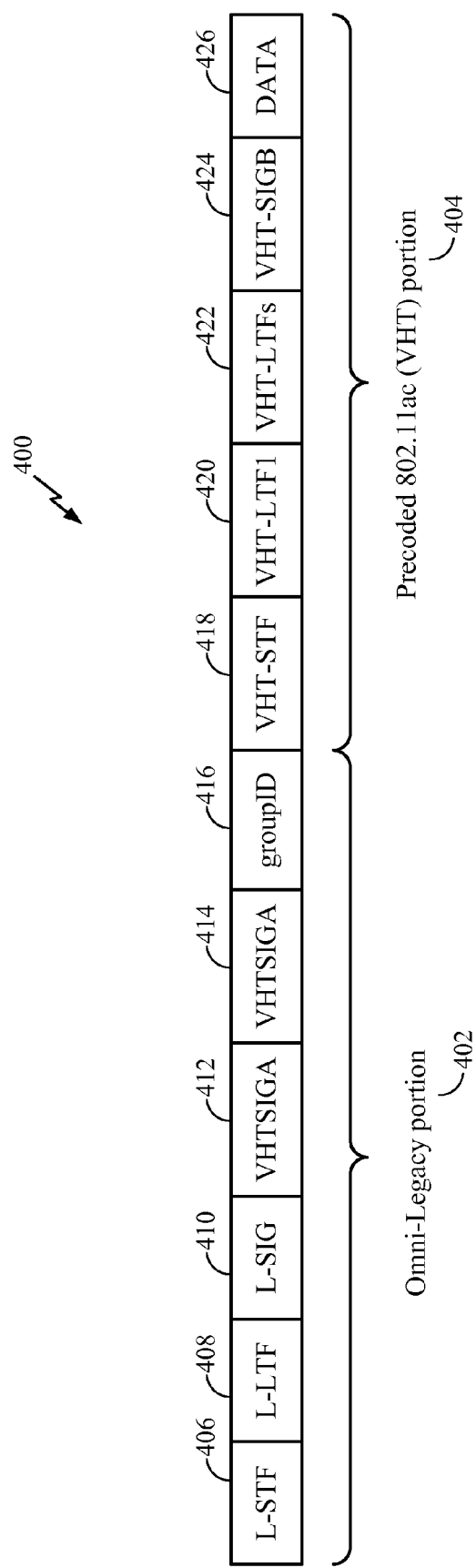
FIG. 4 illustrates an example structure of preamble that may be transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the STAs 120 in the wireless network 100 illustrated in FIG. 1.

The preamble 400 may comprise an omni-legacy portion 402 (i.e., the non-beamformed portion) and a precoded 802.11ac VHT (Very High Throughput) portion 404. The legacy portion 402 may comprise at least one of: a Legacy Short Training Field (L-STF) 406, a Legacy Long Training Field 408, a Legacy Signal (L-SIG) field 410, or two OFDM symbols 412, 414 for VHT Signal type A (VHT-SIGA) fields. The VHT-SIGA fields 412, 414 may be transmitted omni-directionally, and may indicate allocation of numbers of spatial streams to a combination (set) of STAs.

The precoded 802.11ac VHT portion 404 may comprise at least one of: a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal type B (VHT-SIGB) field 424, or a data portion 426. In an aspect, the VHT-SIGB field may comprise one OFDM symbol and may be transmitted precoded/beamformed.

A robust MU-MIMO reception may require that the AP transmits all the VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation/nulling, each STA may be required to know which spatial stream(s) belong(s) to that STA, and which spatial stream(s) belong(s) to other users.

As aforementioned, a groupID field 416 may be included in the preamble 400 to convey to all supported STAs that a particular set of STAs will be receiving spatial streams of a MU-MIMO transmission. As a baseline, if groups are formed which may be mapped to unique sets of STAs, a very large number of groupID bits within the preamble 400 may be required for complete scheduling flexibility. On the other hand, if overloading of a groupID is allowed where multiple sets (combinations) of STAs may be mapped to one groupID, a greater flexibility may be achieved in the number of STAs that can be scheduled together.

In one aspect, in the case of overloading, pre-selection of a smaller set of MU-MIMO recipients may be required for a fixed time into the future. In this case, it may be required to a priori decide on potential MU-MIMO recipients, for example, every 20 ms, and then to assign to these recipients MU-STAIDs (station identifiers). The problem with this approach may arise if the assigned STAs miss the MU-STAID announcement. In another aspect, in the case of overloading, a group definition message may need to be transmitted from an access point every time an STA combination is not found in the existing (overloaded) groups, which may be inefficient.

Enhanced Group Identification Scheme

Certain aspects of the present disclosure support efficient group definition and overloading to avoid aforementioned limitations. In particular, for an exemplary case of four STAs per MU-MIMO transmission, it is shown in the present disclosure that, by using only six groupID bits and a 16-byte one-time message transmitted to each STA, the proposed technique may provide almost full flexibility in scheduling any combination of STAs depending upon the instantaneous buffer status.

The present disclosure proposes a technique to perform downlink (DL) MIMO transmissions to, for example, $2^y$ groups of STAs, where y represents the number of groupID bits. Every groupID may allow for transmissions to multiple sets of STAs through overloading. In other words, one group specified by a particular groupID value may correspond to multiple combinations (sets) of STAs.

Every time an MU-MIMO capable STA is admitted to the network, a STA number may be assigned for every group to convey a position of that STA in each group. For example, if there are 16 groups and four users per MU-MIMO transmission, STA numbers (1, 2, 3 or 4) associated with the STA may be assigned for each of the 16 groups through a 32-bit message. In general, STA numbers, 1 through M, where M denotes the maximum number of users in a DL MU-MIMO transmission, may be assigned to each STA for every group.

In an aspect of the present disclosure, the assignment of STA numbers may be achieved by utilizing a broadcast message transmitted to all the MU-MIMO capable STAs. In another aspect, the STA numbers may be assigned by transmitting a different unicast message from an access point to each of the MU-MIMO capable STAs. For example, the unicast message may be transmitted during a procedure of associating a MU-MIMO capable STA with an access point.

In an aspect of the present disclosure, the STA numbers for all groups may be randomly assigned for all the MU-MIMO capable STAs. Each of the randomly assigned STA numbers (i.e., randomly assigned positions in groups for stream allocation) may be calculated using a pseudo-random number generator seeded by a function of a corresponding STAID (a station identifier). In another aspect of the present disclosure, the assignment of STA numbers may be performed such that to avoid giving a pair of STAs the same STA number in all groups, i.e., the pair of STAs may have different positions for stream allocation in at least one of the groups.

If y bits are utilized for the groupID field of the preamble, and there are, for example, four supported STAs per MU-MIMO transmission, then, for each groupID, the entire set of STAs may be split into four subsets. Each subset may correspond to one STA number. A total number of STA combinations supported per group may be approximately equal to $(N/4)^4$, where N is the number of supported STAs. In an aspect, the arrival of traffic may be random. In this exemplary case, a total number of possible STA combinations may be equal to $N_{C_4}$, i.e., equal to the number of combination of four elements out of N elements.

In an aspect, a probability that a randomly picked STA combination is not found in a group specified by the groupID may be given as:

$$1 - \frac{\left(\frac{N}{4}\right)^4}{N_{C_4}}, \quad (1)$$

which may be approximately equal to 1-24/256 for large N. A probability that a randomly picked STA combination is not found in any group that can be specified by the groupID may be equal to:

$$\left(1 - \frac{\left(\frac{N}{4}\right)^4}{N_{C_4}}\right)^{2^y}. \quad (2)$$

Figure 5:
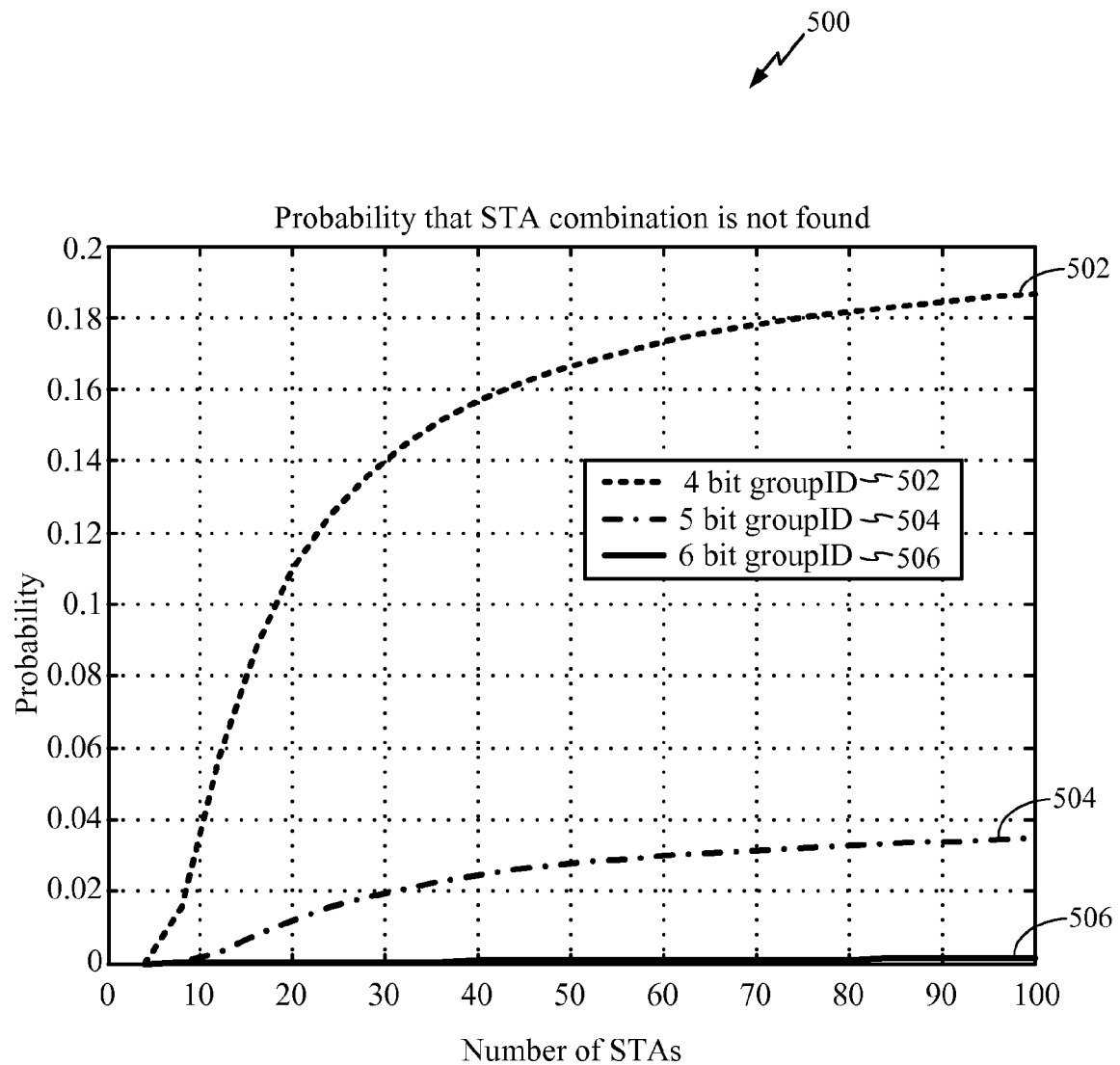
FIG. 5 illustrates an example graph performance of a proposed enhanced group identification scheme in accordance with certain aspects of the present disclosure

FIG. 5 illustrates a graph 500 of the probability given by equation (2) as a function of the total number of supported STAs N for different numbers of groupID bits y, wherein four STAs may be randomly scheduled at a time. It can be observed from FIG. 5 that, for a Basic Service Set (BSS) with 100 MU-MIMO capable STAs and 4-bit groupID (i.e., N=100, and y=4), there may be approximately 18% chance of not finding a particular STA combination (a plot 502 in FIG. 5). This probability may be reduced to less than 4% with a 5-bit group ID (a plot 504 in FIG. 5), and to approximately 0.1% with a 6-bit group ID (a plot 506 in FIG. 5).

Figure 6:
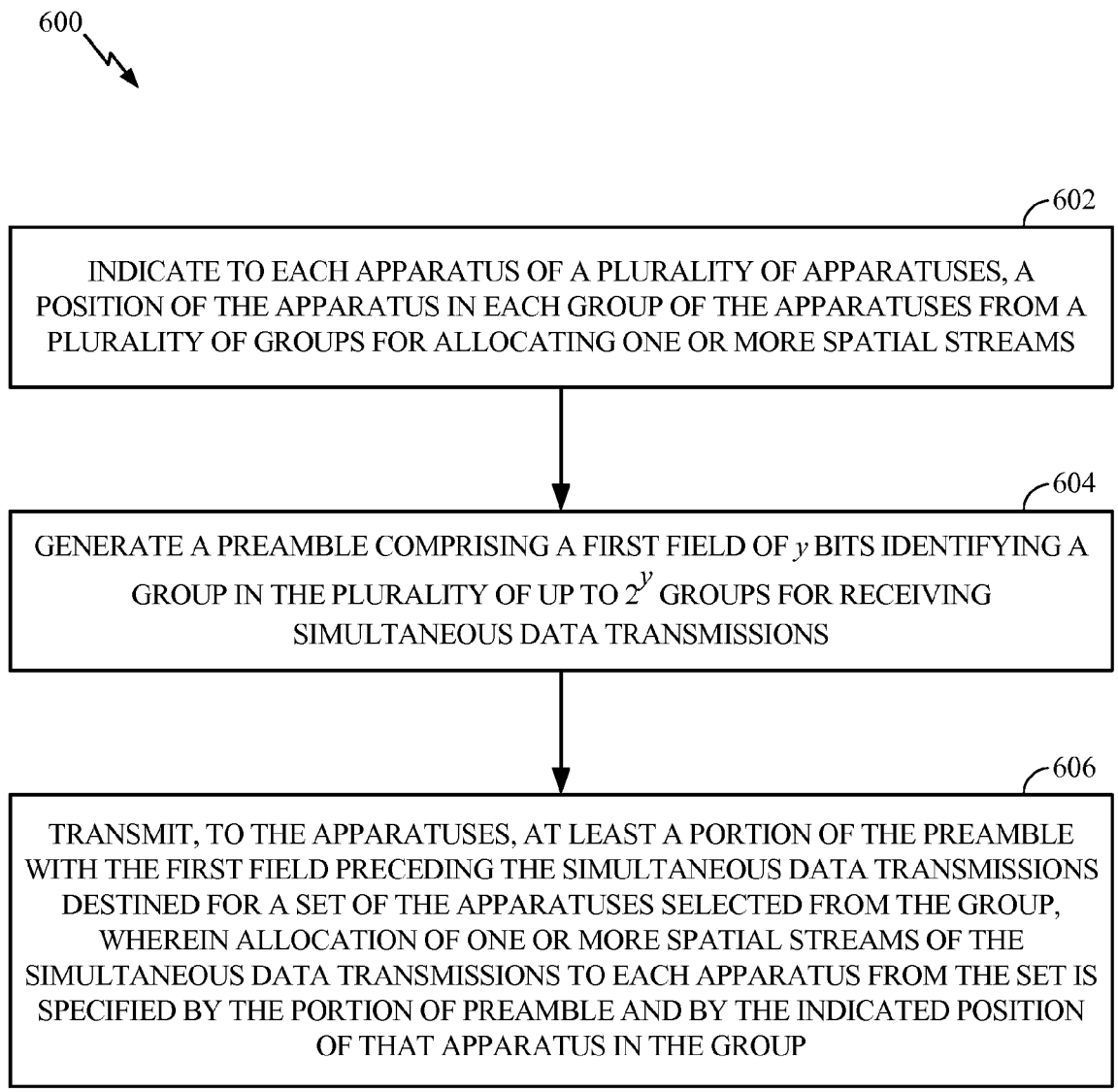
FIG. 6 illustrates example operations that may be performed at an access point for group identification in accordance with certain aspects of the present disclosure.

FIG. 6 illustrates example operations 600 that may be performed at an access point for group identification in accordance with certain aspects of the present disclosure. At 602, the access point may indicate to each STA of a plurality of STAs, a position of the STA in each group of the STAs from a plurality of groups for allocating one or more spatial streams. At 604, the access point may generate a preamble comprising a first field of y bits identifying a group in the plurality of up to $2^y$ groups for receiving simultaneous data transmissions. In an aspect, the first field may comprise a groupID field. At 606, the access point may transmit, to the STAs, at least a portion of the preamble with the first field preceding the simultaneous data transmissions destined for a set of the STAs selected from the group, wherein allocation of one or more spatial streams of the simultaneous data transmissions to each STA from the set may be specified by the portion of preamble and by the indicated position of that STA in the group.

In an aspect, each of the groups may comprise multiple sets of the STAs. In an aspect, the portion of preamble may comprise a second field indicating a number of the spatial streams allocated to each STA from the set, wherein the second field may comprise a signal (SIG) field (e.g., a VHT-SIGA field). In an aspect, the indication of positions to one of the STAs may be performed only for a subset of the $2^y$ groups of which that STA is a member. In an aspect, the indication may comprise transmitting a message (a broadcast message or a unicast message) to that STA. Further, the subset may be identified in the message using a bitmap of $2^y$ bits.

Figure 7:
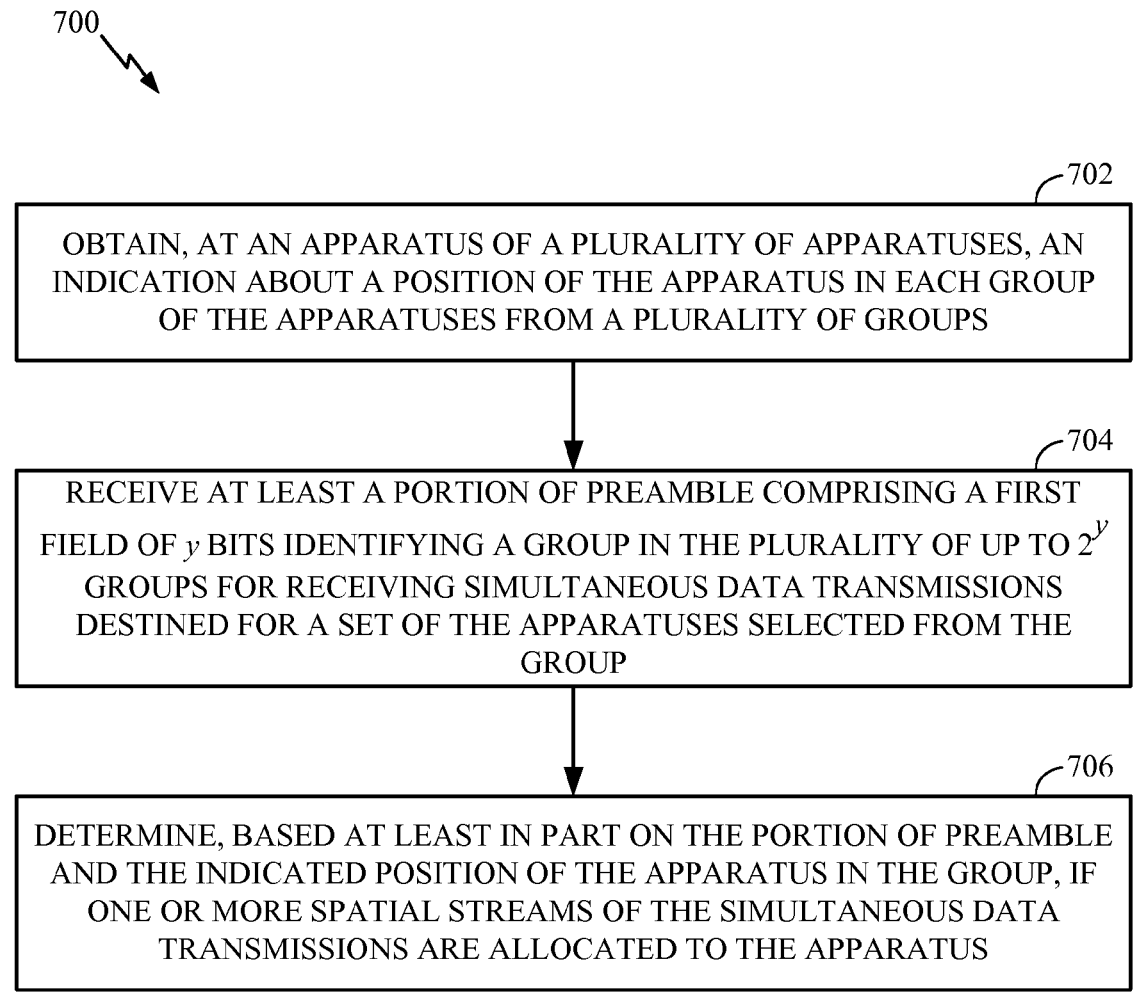
FIG. 7 illustrates example operations that may be performed at a user station in accordance with certain aspects of the present disclosure.

FIG. 7 illustrates example operations 700 that may be performed at a STA of a plurality of STAs in accordance with certain aspects of the present disclosure. At 702, the STA may obtain, from an access point, an indication about a position of the STA in each group of the STAs from a plurality of groups. At 704, the STA may receive at least a portion of preamble comprising a first field of y bits identifying a group in the plurality of up to $2^y$ groups for receiving simultaneous data transmissions destined for a set of the STAs selected from the group. In an aspect, the first field may comprise a groupID field. At 706, the STA may determine, based at least in part on the portion of preamble and the indicated position of the STA in the group, if one or more spatial streams of the simultaneous data transmissions are allocated to the STA. In an aspect, determining if the one or more spatial streams are allocated to the STA comprises comparing an identifier of the STA with a value of the first field and the indicated position of the apparatus in the group.

In an aspect, the first field may identify multiple sets of the STAs in the group. In an aspect, the portion of received preamble may comprise a second field indicating a number of spatial streams of the simultaneous data transmissions allocated to each STA from the set, wherein the second field may comprise a signal (SIG) field (e.g., a VHT-SIGA field). In an aspect, the indications about positions of the STA may be only associated with a subset of the $2^y$ groups of which the STA is a member. In an aspect, the indications about positions may be obtained in a message (a broadcast message or a unicast message). Further, the subset may be identified in the message using a bitmap of $2^y$ bits.

In an aspect, the STA may transmit, in response to the indication, a message specifying that the position in the group is different than another position in the same group for allocating the one or more spatial streams, wherein the position and the other position were assigned by different apparatuses. The message may further comprise information about at least one of a subset of the groups of which the apparatus is already a member, or spatial stream positions of the apparatus associated with groups in the subset.

To summarize, certain aspects of the present disclosure support, for a user STA being associated with an access point, group definition and overloading that may not require additional messaging. Nearly all possible combinations of STAs may be supported with a six-bit groupID field of a transmission preamble and with one-time message transmitted to every STA (e.g., during association procedure). In an aspect, the access point may be only required to maintain a simple record for every STA, i.e. a STA number for that STA in every group. By applying the proposed technique, it may be not be required to predict MU-MIMO recipients in advance.

Figure 6A:
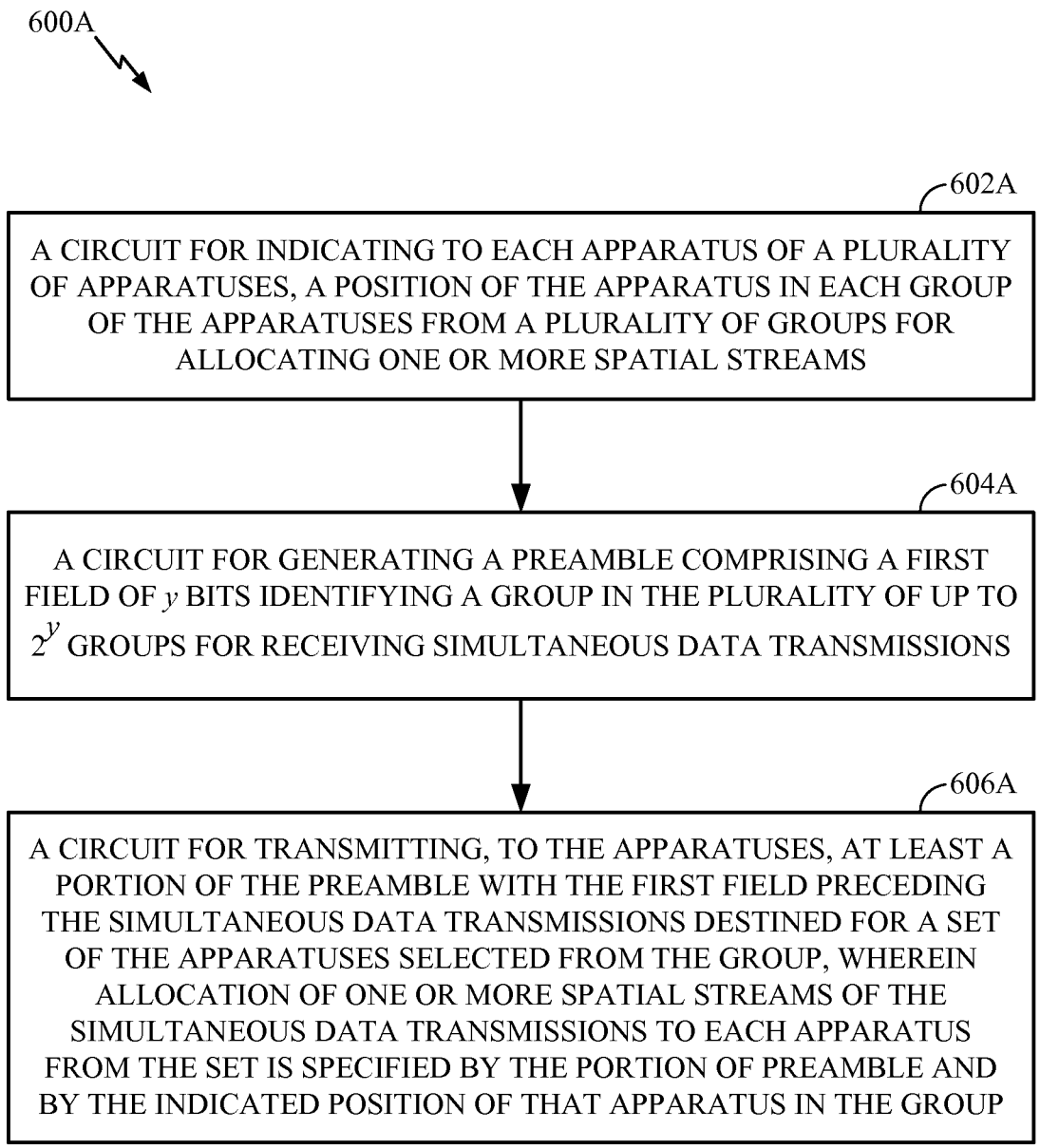
FIG. 6A illustrates example components capable of performing the operations shown in FIG. 6.
Figure 7A:
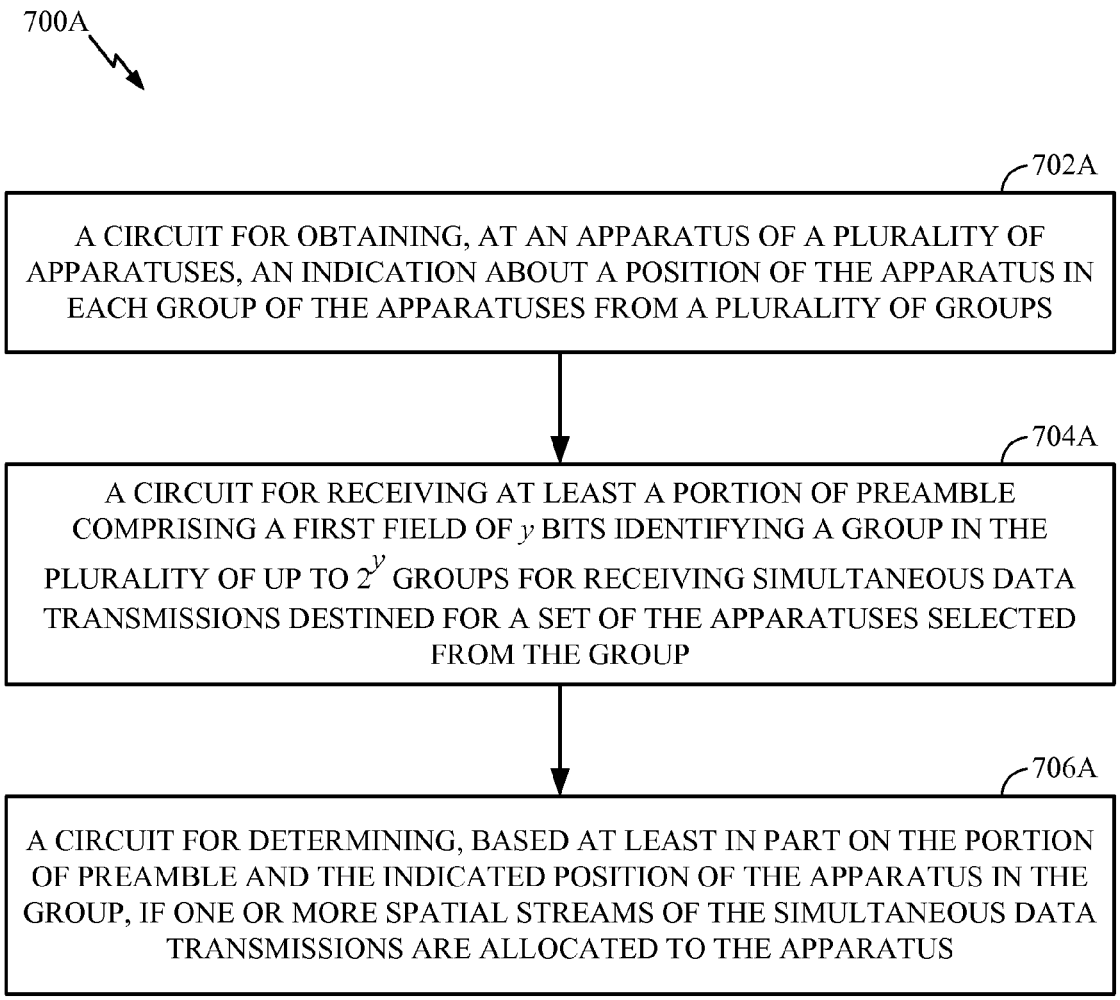
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 and 700 illustrated in FIGS. 6 and 7 correspond to components 600A and 700A illustrated in FIGS. 6A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 222 from FIG. 2 of the access point 110, or the transmitter 310 from FIG. 3 of the wireless device 302. The means for indicating may comprise an application specific integrated circuit, e.g., the processor 210 from FIG. 2 of the access point 110, the transmitter 222, the processor 304 from FIG. 3 of the wireless device 302, or the transmitter 310. The means for generating may comprise an application specific integrated circuit, e.g., the processor 210, or the processor 304. The means for receiving may comprise a receiver, e.g., a receiver 254 from FIG. 2 of the user terminal 120, or the receiver 312 from FIG. 3 of the wireless device 302. The means for obtaining may comprise an application specific integrated circuit, e.g., the processor 270 from FIG. 2 of the user terminal 120, the receiver 254, the processor 304, or the receiver 312. The means for determining may comprise an application specific integrated circuit, e.g., the processor 270, or the processor 304. The means for comparing may comprise an application specific integrated circuit, e.g., the processor 210, or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Further, a communication device for performing the methods and techniques described in the present disclosure may include various components that perform functions based on signals that are transmitted by or received at the device. In some aspects, the communication device may comprise an access point, a smart phone, a tablet, a television display, a flip-cam, a security video camera, a Digital Video Recorder (DVR), a set top box kiosk, or a media center, etc. According to aspects of the present disclosure, the communication device may operate in accordance with the IEEE 802.11 family of wireless communications standards.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
indicating to each apparatus of a plurality of apparatuses, a position of the apparatus in each group of the apparatuses from a plurality of groups for allocating one or more spatial streams;
generating a preamble comprising a first field of y bits identifying a group in the plurality of up to $2^y$ groups for receiving simultaneous data transmissions, wherein y is chosen such that a probability of not finding a combination of apparatuses in the group identified by the y bits is less than or equal to a threshold value; and
transmitting, to the apparatuses, at least a portion of the preamble with the first field preceding the simultaneous data transmissions destined for a set of the apparatuses selected from the group identified by the y bits,
wherein allocation of one or more spatial streams of the simultaneous data transmissions to each apparatus from the set is specified by the portion of preamble and by the indicated position of that apparatus in the group identified by the y bits.

2. The method of claim 1, wherein each of the groups comprises multiple sets of the apparatuses.

3. The method of claim 1, wherein the portion of preamble comprises a second field indicating a number of the spatial streams allocated to each apparatus from the set.

4. The method of claim 1, wherein the indication comprises at least one of:
transmitting a broadcast message to all the apparatuses, or
transmitting a unicast message.

5. The method of claim 4, wherein the unicast message is transmitted during a procedure of associating one of the apparatuses that is intended for receiving the unicast message.

6. The method of claim 1, wherein the positions of the apparatus are randomly assigned for all the groups.

7. The method of claim 6, wherein each of the randomly assigned positions is calculated using a pseudo-random number generator seeded by a function of an identifier of the apparatus.

8. The method of claim 1, wherein the indication comprises:
indicating, to a pair of the apparatuses, different positions in at least one of the groups.

9. The method of claim 1, wherein the indication of positions to one of the apparatuses is performed only for a subset of the $2^y$ groups of which that apparatus is a member.

10. The method of claim 9, wherein:
the indication comprises transmitting a message to that apparatus, and
the subset is identified in the message using a bitmap of $2^y$ bits.

11. The method of claim 1, wherein the threshold value is 0.1%.

12. The method of claim 1, wherein y is at least 6.

13. An apparatus for wireless communications, comprising:
a first circuit configured to indicate to each apparatus of a plurality of other apparatuses, a position of the other apparatus in each group of the other apparatuses from a plurality of groups for allocating one or more spatial streams;
a second circuit configured to generate a preamble comprising a first field of y bits identifying a group in the plurality of up to $2^y$ groups for receiving simultaneous data transmissions, wherein y is chosen such that a probability of not finding a combination of apparatuses in the group identified by the y bits is less than or equal to a threshold value; and
a transmitter configured to transmit, to the other apparatuses, at least a portion of the preamble with the first field preceding the simultaneous data transmissions destined for a set of the other apparatuses selected from the group identified by the y bits,
wherein allocation of one or more spatial streams of the simultaneous data transmissions to each apparatus from the set is specified by the portion of preamble and by the indicated position of that apparatus in the group identified by the y bits.

14. The apparatus of claim 13, wherein each of the groups comprises multiple sets of the other apparatuses.

15. The apparatus of claim 13, wherein the portion of preamble comprises a second field indicating a number of the spatial streams allocated to each apparatus from the set.

16. The apparatus of claim 13, wherein the first circuit is also configured to transmit at least one of a broadcast message to all the other apparatuses, or a unicast message.

17. The apparatus of claim 16, wherein the unicast message is transmitted during a procedure of associating one of the other apparatuses that is intended for receiving the unicast message.

18. The apparatus of claim 13, wherein the positions of the other apparatus are randomly assigned for all the groups.

19. The apparatus of claim 18, wherein each of the randomly assigned positions is calculated using a pseudo-random number generator seeded by a function of an identifier of the other apparatus.

20. The apparatus of claim 13, wherein the first circuit is also configured to indicate, to a pair of the other apparatuses, different positions in at least one of the groups.

21. The apparatus of claim 13, wherein the indication of positions to one of the other apparatuses is performed only for a subset of the $2^y$ groups of which that other apparatus is a member.

22. The apparatus of claim 21, wherein the first circuit is also configured to:
transmit a message to that other apparatus, and wherein the subset is identified in the message using a bitmap of $2^y$ bits.

23. The apparatus of claim 13, wherein the threshold value is 0.1%.

24. The apparatus of claim 13, wherein y is at least 6.

25. An apparatus for wireless communications, comprising:
means for indicating to each apparatus of a plurality of other apparatuses, a position of the other apparatus in each group of the other apparatuses from a plurality of groups for allocating one or more spatial streams;
means for generating a preamble comprising a first field of y bits identifying a group in the plurality of up to $2^y$ groups for receiving simultaneous data transmissions, wherein y is chosen such that a probability of not finding a combination of apparatuses in the group identified by the y bits is less than or equal to a threshold value; and
means for transmitting, to the other apparatuses, at least a portion of the preamble with the first field preceding the simultaneous data transmissions destined for a set of the other apparatuses selected from the group identified by the y bits,
wherein allocation of one or more spatial streams of the simultaneous data transmissions to each apparatus from the set is specified by the portion of preamble and by the indicated position of that apparatus in the group identified by the y bits.

26. The apparatus of claim 25, wherein each of the groups comprises multiple sets of the other apparatuses.

27. The apparatus of claim 25, wherein the portion of preamble comprises a second field indicating a number of the spatial streams allocated to each apparatus from the set.

28. The apparatus of claim 25, wherein the means for indicating comprises at least one of:
means for transmitting a broadcast message to all the other apparatuses, or
means for transmitting a unicast message.

29. The apparatus of claim 28, wherein the unicast message is transmitted during a procedure of associating one of the other apparatuses that is intended for receiving the unicast message.

30. The apparatus of claim 25, wherein the positions of the other apparatus are randomly assigned for all the groups.

31. The apparatus of claim 30, wherein each of the randomly assigned positions is calculated using a pseudo-random number generator seeded by a function of an identifier of the other apparatus.

32. The apparatus of claim 25, wherein the means for indicating comprises:
means for indicating, to a pair of the other apparatuses, different positions in at least one of the groups.

33. The apparatus of claim 25, wherein the indication of positions to one of the other apparatuses is performed only for a subset of the $2^y$ groups of which that other apparatus is a member.

34. The apparatus of claim 33, wherein the means for indicating comprises:
transmitting a message to that other apparatus, and wherein the subset is identified in the message using a bitmap of $2^y$ bits.

35. The apparatus of claim 25, wherein the threshold value is 0.1%.

36. The apparatus of claim 25, wherein y is at least 6.

37. A non-transitory computer-readable medium encoded with instructions executable to:
indicate to each apparatus of a plurality of apparatuses, a position of the apparatus in each group of the apparatuses from a plurality of groups for allocating one or more spatial streams;
generate a preamble comprising a first field of y bits identifying a group in the plurality of up to $2^y$ groups for receiving simultaneous data transmissions, wherein y is chosen such that a probability of not finding a combination of apparatuses in the group identified by the y bits is less than or equal to a threshold value; and transmit, to the apparatuses, at least a portion of the preamble with the first field preceding the simultaneous data transmissions destined for a set of the apparatuses selected from the group identified by the y bits, wherein allocation of one or more spatial streams of the simultaneous data transmissions to each apparatus from the set is specified by the portion of preamble and by the indicated position of that apparatus in the group identified by the y bits.

38. A communication device, comprising:

at least one antenna;

a first circuit configured to indicate to each apparatus of a plurality of apparatuses, a position of the apparatus in each group of the apparatuses from a plurality of groups for allocating one or more spatial streams;

a second circuit configured to generate a preamble comprising a first field of y bits identifying a group in the plurality of up to $2^y$ groups for receiving simultaneous data transmissions, wherein y is chosen such that a probability of not finding a combination of apparatuses in the group identified by the y bits is less than or equal to a threshold value; and a transmitter configured to transmit, to the apparatuses via the at least one antenna, at least a portion of the preamble with the first field preceding the simultaneous data transmissions destined for a set of the apparatuses selected from the group identified by the y bits, wherein allocation of one or more spatial streams of the simultaneous data transmissions to each apparatus from the set is specified by the portion of preamble and by the indicated position of that apparatus in the group identified by the y bits.

\* \* \* \* \*